United States Patent
Yabuta (10) Patent No.: US 8,862,376 B2
(45) Date of Patent: Oct. 14, 2014

(54) CRUISING DISTANCE CALCULATION APPARATUS FOR A HYBRID VEHICLE

(71) Applicant: Mitsubishi Jidosha Kogyo Kabushiki Kaisha, Tokyo (JP)

(72) Inventor: Ryosuke Yabuta, Tokyo (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/086,525

(22) Filed: Nov. 21, 2013

(65) Prior Publication Data

US 2014/0142836 A1   May 22, 2014

(30) Foreign Application Priority Data

Nov. 22, 2012   (JP) .................................. 2012-256374

(51) Int. Cl.
*G06F 19/00*   (2011.01)
*B60W 50/14*   (2012.01)
*B60W 10/06*   (2006.01)
*B60W 10/08*   (2006.01)

(52) U.S. Cl.
CPC ............. *B60W 50/14* (2013.01); *Y02T 10/6286* (2013.01); *Y02T 10/6217* (2013.01); *B60W 10/06* (2013.01); *Y02T 10/6234* (2013.01); *Y10S 903/93* (2013.01); *Y02T 10/7077* (2013.01); *G60W 20/00* (2013.01); *B60W 10/08* (2013.01)
USPC .......................................... 701/123; 903/930

(58) Field of Classification Search
CPC ..... B60W 10/00; B60W 10/08; B60W 10/26; B60W 2030/18009
USPC ......................................................... 701/123
See application file for complete search history.

(56) References Cited

U.S. PATENT DOCUMENTS

| 6,480,767 | B2 | 11/2002 | Yamaguchi et al. |
| 2002/0062183 | A1 | 5/2002 | Yamaguchi et al. |
| 2014/0005855 | A1* | 1/2014 | Hu et al. ........................... 701/1 |

FOREIGN PATENT DOCUMENTS

| JP | 2001-231103 A | 8/2001 |
| JP | 2002-171604 A | 6/2002 |
| JP | 2009-274566 A | 11/2009 |
| JP | 2010-226795 A | 10/2010 |
| WO | WO 2013/098990 A1 | 4/2013 |

* cited by examiner

*Primary Examiner* — James Trammell
*Assistant Examiner* — Michael D Lang
(74) *Attorney, Agent, or Firm* — Birch, Stewart, Kolasch & Birch, LLP (57) ABSTRACT

A cruising distance calculation apparatus for a hybrid vehicle that includes a motor and an engine for driving a generator is disclosed. The cruising distance calculation apparatus includes a traveling mode decision unit that decides in which one of traveling modes the vehicle is traveling, the traveling modes including at least EV traveling mode and series traveling mode, an electricity consumption calculation unit that calculates, when the traveling mode is the EV traveling mode, an electric power consumption amount Ec of the battery based on electric power consumption of the battery whereas the electricity consumption unit calculates, when the traveling mode is the series traveling mode, the electric power consumption amount Ec based on output power of the motor, an electric mileage calculation unit that calculates an electric mileage Eef, and a cruising distance calculation unit that estimates a first cruising distance Dp1.

4 Claims, 4 Drawing Sheets

EV traveling mode and series traveling mode

FIG. 3(b)

Series traveling mode and parallel traveling mode

FIG. 4

EV15km → Parallel 20 km → Series 10 km → Parallel 20 km

FIG. 5

CRUISING DISTANCE CALCULATION APPARATUS FOR A HYBRID VEHICLE

CROSS-REFERENCE TO THE RELATED APPLICATION

This application incorporates by references the subject matter of Application No. 2012-256374 filed in Japan on Nov. 22, 2012 on which a priority claim is based under 35 U.S.C. §119(a).

FIELD

The present invention relates to a cruising distance calculation apparatus suitable for use with a hybrid car.

BACKGROUND

In recent years, development of an electric automobile that uses a motor for traveling driven by electric power from a battery for traveling as a driving source or a hybrid car that uses an engine and a motor for traveling as a driving source is performed to replace an automobile that uses only an internal combustion engine (engine) as a driving source. In such an electric automobile or a hybrid vehicle as described above, similarly as in a case in which a driver grasps a remaining amount of fuel and suitably performs refueling in an automobile that only uses an engine as a driving source, it is necessary for a driver to grasp a remaining amount of a battery (remaining electric power amount of a battery) or a remaining amount of fuel and suitably perform battery charging and refueling. In this case, the remaining amount of the battery for traveling and the remaining amount of fuel are displayed on meters or the like to let the driver know the remaining amounts.

However, it is difficult for the driver to grasp an actual travelable distance from the displayed the remaining amount of the battery or the remaining amount of fuel on meters, and there is the possibility that the remaining amount of the battery or the fuel may be insufficient before arrival at a destination.

Therefore, a technology has been developed to make it possible that, in an electric automobile or a hybrid vehicle, not only a remaining amount of the battery and a remaining amount of fuel are simply detected and displayed but also a travelable distance (cruising distance) of the vehicle is estimated and indicated to the driver, or based on a travelable distance and a traveling distance to a destination, it is decided whether or not the vehicle can travel to the destination with the present remaining amount of the battery or the present remaining amount of fuel.

For example, Patent Document 1 (Japanese Patent Application Laid-Open Publication No. 2010-226795) discloses a technology relating to calculation of a travelable distance in an electric automobile. In this technology, since the travelable distance with the present remaining amount of the battery varies according to an operation situation of an air conditioner, a travelable distance corresponding to a variation of the operation situation of the air conditioner is calculated. In other words, a voltage is multiplied by a current to calculate an electric power consumption amount of a motor generator, and a traveling distance in a predetermined period is divided by electric power consumption amount to calculate an electric power amount consumption ratio (namely, electric mileage). Then, a remaining amount of electric power is multiplied by electric power amount consumption ratio to calculate a travelable distance corresponding to a stopping state of the air conditioner. On the other hand, electric power consumption amount of the air conditioner is added to electric power consumption amount calculated by multiplying the voltage by the current to calculate a second electric power consumption amount. Then, the traveling distance in the predetermined period is divided by the second electric power consumption amount to calculate a second electric power amount consumption ratio corresponding to the operation state of the air conditioner, and then the remaining amount of electric power is multiplied by the second electric power amount consumption ratio to calculate a travelable distance corresponding to the operation state of the air conditioner.

Incidentally, in a hybrid vehicle, an optimum traveling mode is automatically selected in response to a driving state or a vehicle state. The traveling mode includes, for example, a mode called EV traveling mode in which the vehicle travels only with a motor for traveling and another mode called series traveling mode in which the vehicle travels only with a motor for traveling while generation of electric power is performed by an engine. Generally, when the EV traveling mode is selected, only electric power of a battery is used, whereas when the series traveling mode is selected, both of fuel in a fuel tank and electric power of a battery are used.

Therefore, if the electric mileage and the fuel mileage (value calculated by dividing a traveling distance in a predetermined period by a fuel consumption amount) are calculated without taking the traveling modes into consideration, it is possible that an error from an actual electric mileage and an actual fuel mileage may appear or a calculation load may increase. For example, since motor traveling in the EV traveling mode is performed without consuming fuel, when calculation of the fuel mileage is performed in the EV traveling mode, the fuel mileage is calculated to a better value than that of the actual fuel mileage, and the error from the actual fuel mileage increases and the accuracy of the calculation degrades. Further, in the series traveling mode, charging by engine electric power generation and discharging by the motor traveling are performed in parallel to each other in the battery. Therefore, the charging ratio of the battery constantly varies, and if a balance between charging and discharging is successively calculated, it is possible that the calculation load may become heavy.

If a calculation error in the electric mileage or the fuel mileage appears in such a manner as described above, an error also appears in calculation of a cruising distance of a hybrid vehicle and an erroneous cruising distance is indicated to the driver. The driver would grasp the indicated cruising distance and perform battery charging and refueling if the cruising distance decreases. For the decision of the charging and the refueling, the cruising distance is desired to be an accurate value and is required to be at least a surely travelable value.

SUMMARY

Technical Problems

The present invention has been made in view of such a subject as described above, and it is an object of the present invention to enhance the reliability and validity of a calculation value of a cruising distance in a cruising distance calculation apparatus for a hybrid vehicle.

It is to be noted that, in addition to the object described above, it can be also regarded as an object of the present invention to achieve such effects and advantages that are not provided by the conventional technologies and are provided by the constitutions of a mode for carrying out the invention hereinafter described.

Solution to Problems (1) A cruising distance calculation apparatus for a hybrid vehicle as disclosed herein includes a motor to drive the hybrid vehicle and an engine to drive a generator. The cruising distance calculation apparatus includes a traveling mode decision unit, an electricity consumption calculation unit, an electric mileage calculation unit, and a cruising distance calculation unit. The traveling mode decision unit decides in which one of traveling modes the vehicle is traveling, the traveling modes including a first traveling mode in which the vehicle travels with electric power supplied from a battery and a second traveling mode in which the vehicle travels while electric power generated by the generator is supplied to the battery. The electricity consumption calculation unit calculates, when it is decided by the traveling mode decision unit that the vehicle is traveling in the first traveling mode, an electric power consumption amount of the battery based on power consumption of the battery whereas the electricity consumption unit calculates, when it is decided by the traveling mode decision unit that the vehicle is traveling in the second traveling mode, electric power consumption amount based on output power of the motor. The electric mileage calculation unit calculates a traveling distance per a unit capacity of the battery as an electric mileage based on electric power consumption amount calculated by the electricity consumption calculation unit and a traveling distance of the vehicle. The cruising distance calculation unit estimates a distance which the vehicle can travel with a remaining amount of electric power of the battery as a first cruising distance based on the electric mileage calculated by the electric mileage calculation unit and the remaining amount of electric power.

(2) Preferably, the traveling modes further include a third traveling mode (a so-called parallel traveling mode) in which the vehicle travels with the engine. In this instance, preferably the cruising distance calculation apparatus further comprises a fuel mileage calculation unit that calculates, when the traveling mode decided by the traveling mode decision unit is the second traveling mode or the third traveling mode, a traveling distance per a unit fuel amount as a fuel mileage based on the consumption amount of fuel consumed by the engine and the traveling distance of the vehicle traveled in the decided traveling mode. Preferably, the cruising distance calculation unit estimates a distance which the vehicle can travel with a remaining amount of fuel as a second cruising distance based on the fuel mileage calculated by the fuel mileage calculation unit and the remaining amount of fuel.

(3) Preferably, the cruising distance calculation apparatus for a hybrid vehicle further includes a display unit that displays a total cruising distance that is an overall cruising distance calculated by adding the first cruising distance and the second cruising distance.

(4) Preferably, the cruising distance calculation apparatus for a hybrid vehicle further includes a display unit that displays the first cruising distance and the second cruising distance calculated by the cruising distance calculation unit.

(5) Preferably, the cruising distance calculation apparatus for a hybrid vehicle further includes a display unit that displays a total cruising distance that is an overall cruising distance calculated by adding the first cruising distance and the second cruising distance, the first cruising distance calculated by the cruising distance calculation unit and the second cruising distance calculated by the cruising distance calculation unit.

Advantageous Effects

With the cruising distance calculation apparatus for a hybrid vehicle of the present disclosure, electric power consumption amount of the battery is calculated based on electric power consumption of the battery when the vehicle travels in the first traveling mode whereas electric power consumption amount of the battery is calculated based on the output power of the motor when the vehicle travels in the second traveling mode. Therefore, the electric mileage can be calculated taking the traveling mode into consideration and the accuracy of the calculation of the electric mileage can be enhanced. Consequently, the reliability and the validity of the calculation value of the cruising distance can be enhanced.

BRIEF DESCRIPTION OF DRAWINGS

The nature of this invention, as well as other objects and advantages thereof, will be explained in the following with reference to the accompanying drawings, in which like reference characters designate the same or similar parts throughout the figures and wherein:

FIGS. 3(a) and 3(b) are views exemplifying a calculation process by the cruising distance calculation apparatus of FIG. 1, wherein FIG. 3(a) depicts a calculation process in an EV traveling mode and a series traveling mode and FIG. 3(b) depicts a calculation process in a series traveling mode and a parallel traveling mode;

DESCRIPTION OF EMBODIMENTS

A cruising distance calculation apparatus is described with reference to the drawings. It is to be noted that the embodiment hereinafter described is illustrative to the end, and there is no intention to eliminate various modifications and applications of the technology not specified in the embodiment hereinafter described.

[1. General Configuration]

Figure 1:
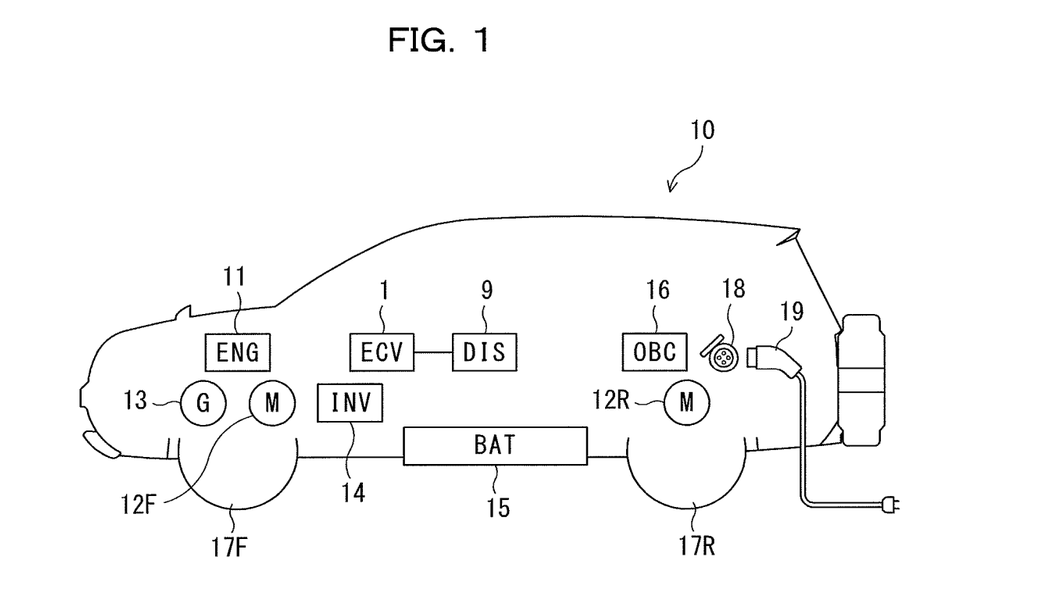
FIG. 1 is a diagram of a vehicle to which a cruising distance calculation apparatus according to an embodiment is applied.

The cruising distance calculation apparatus of the present embodiment is applied to a vehicle 10 depicted in FIG. 1. The vehicle 10 is a plug-in hybrid electric vehicle (PHEV) that uses an engine 11, an electric front motor 12F and an electric rear motor 12R as driving sources and allows external power charging. The vehicle 10 includes the engine 11, front motor 12F and rear motor 12R (when the motors are not distinguished, each of them is hereinafter referred to simply as motor 12), a generator 13, an inverter 14, a battery 15 for traveling (hereinafter referred to simply as battery 15), a transaxle (not depicted) and so forth.

Driving force of the engine 11 and the motor 12 is transmitted to front wheels 17F and rear wheels 17R (hereinafter referred to also as driving wheels 17) through the transaxle so that the vehicle 10 travels. The engine 11 is an internal combustion engine (gasoline engine or diesel engine) using gasoline or light oil as a fuel and drives an axle (driving shaft) of the front wheels 17F. Gasoline or light oil that is a fuel for the engine 11 is refilled into a fuel tank not depicted upon fuel supply.

Figure 2:
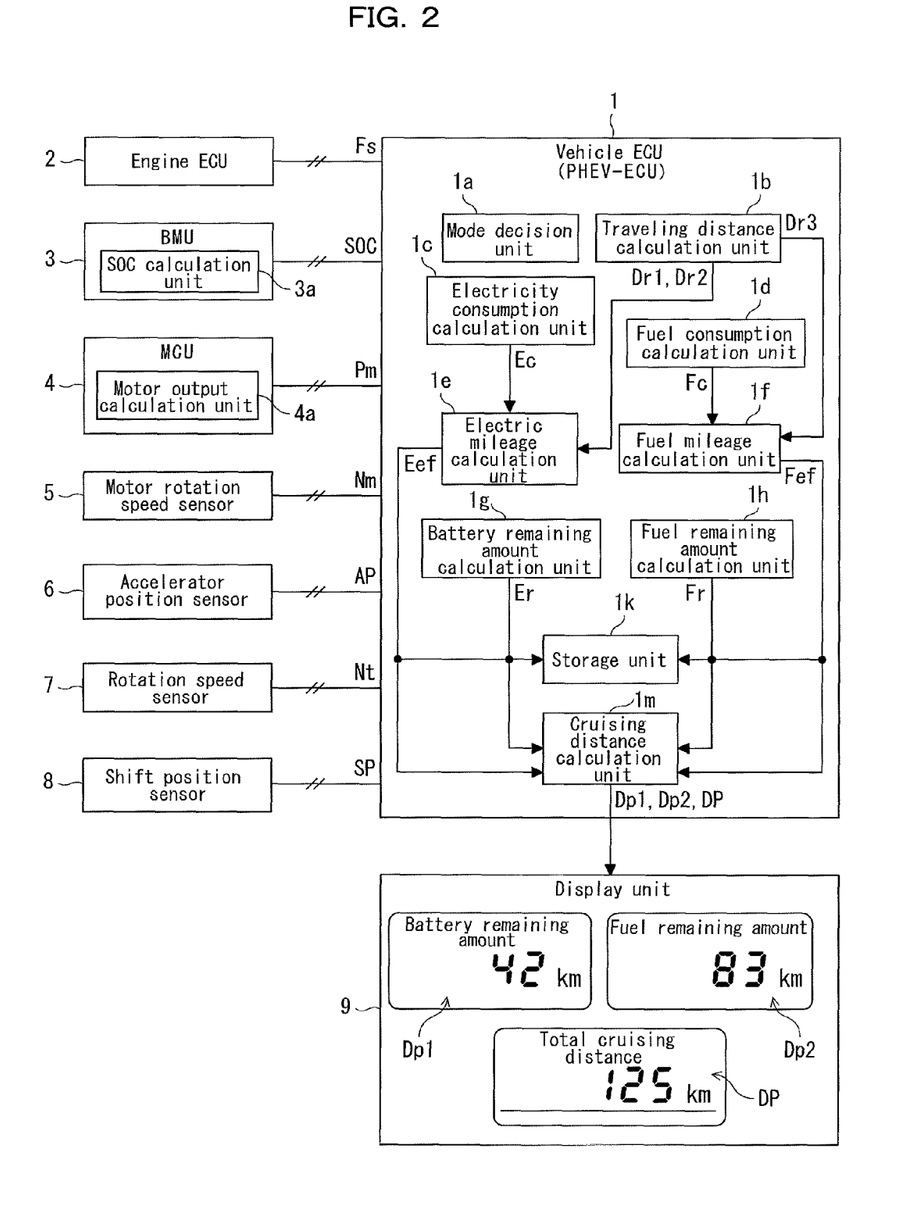
FIG. 2 is a block diagram of the cruising distance calculation apparatus of FIG. 1.

The motor 12 is an electric motor for receiving supply of electric power of the battery 15 incorporated under the floor of the vehicle 10 or electric power generated by the generator 13 to generate motive power. Here, the front motor 12F drives the axle (driving shaft) of the front wheels 17F and the rear motor 12R drives an axle (driving shaft) of the rear wheels 17R. As depicted in FIG. 2, the motor 12 includes a motor rotation speed sensor 5 for detecting a motor rotation number (motor rotation speed) Nm. Information of the motor rotation speed is transmitted to a vehicle ECU 1 hereinafter described.

The generator 13 is an electric power generator connected to the engine 11 through a gearbox (not depicted) for generating electric power by the output power of the engine 11. Electric power generated by the generator 13 is supplied to and charged into the battery 15 or is directly supplied to the motor 12 so as to be used as a power source for the motor 12. It is to be noted that, while a case is described in which the motor 12 and the generator 13 are provided independently of each other, a motor generator in which the motor 12 and the generator 13 are integrally provided may be incorporated.

The inverter 14 is disposed in a feeder circuit which connects the motor 12, the generator 13 and the battery 15 to each other. Current delivered on the battery 15 side with respect to the inverter 14 is direct current, and current delivered on the motor 12, generator 13 side with respect to the inverter 14 is alternating current. The inverter 14 performs conversion of the current between direct current and alternating current. Further, the rotation speed Nm of the motor 12 varies in proportion to an alternating current frequency of current supplied to the motor 12. Accordingly, by controlling the inverter 14, the rotation speed Nm of the motor 12 and torque Tm can be adjusted.

The battery 15 is an electric storage apparatus that can be charged by regeneration electric power of the vehicle 10, an external power supply, or electric power generated by the generator 13 and is, for example, a lithium ion secondary battery, a lithium ion polymer secondary battery or the like. The battery 15 is a main electric power supply (main motive power source) for the motor 12.

The transaxle is a motive power transmission apparatus configured by integrally forming a final drive (final reduction gear) including a differential gear (differential apparatus) and a transmission (reduction gear) and includes a plurality of mechanisms having a role of performing motive power transmission between the engine 11 and the motor 12 as the driving sources and the driving wheels 17. Further, a clutch is provided in the inside of the transaxle. The clutch is used to control a connection or disconnection state of the motive power of the engine 11 and is disposed on the force transmission path from the engine 11 to the driving wheels 17.

An inlet 18 (electric power inlet) for connecting a charging cable 19 thereto upon external charging is provided on the outer surface of the vehicle 10. Further, a vehicle-carried charger 16 (OBC, On Board Charger) is provided in a circuit which connects the battery 15 and the inlet 18. The vehicle-carried charger 16 is a power conversion apparatus for converting alternating current electric power supplied by a household electric power supply, a charging station or the like on the outside of the vehicle 10 into direct current electric power.

Further, as depicted in FIG. 2, the vehicle 10 includes an accelerator position sensor 6 for detecting an accelerator position AP corresponding to an operation amount of the acceleration pedal, a rotation speed sensor 7 for detecting a rotation speed Nt of the driving shaft of the front wheels 17F (hereinafter referred to also as rotation speed Nt of the driving wheels 17), and a shift position sensor 8 for detecting a shift position (operation position) SP of a shift lever. It is to be noted that the shift lever here is configured for changeover among parking (P range), neutral (N range), drive (D range) and reverse (R range) ranges. Information including the acceleration position AP, the rotation speed Nt and the shift position SP is transmitted to the vehicle ECU 1. A display apparatus (display unit) 9 built in an instrument panel is connected to the vehicle ECU 1.

A plurality of electronic controlling apparatus connected to each other through a communication line (not depicted) are provided in the inside of the vehicle 10. The communication line may be configured from a bus of a vehicle-carried LAN that complies with the standard such as, for example, CAN or MOST, or a signal line for exclusive use. While only the vehicle ECU 1 is exemplified as the electronic controlling apparatus in FIG. 1, an engine ECU 2, a BMU 3 and an MCU 4 are further provided in the vehicle 10 as depicted in FIG. 2. The electronic controlling apparatus are configured as an LSI device in which a known microprocessor, a ROM, a RAM and so forth are integrated or a built-in electronic device.

The engine ECU 2 (Engine Electronic Control Unit) is an electronic controlling apparatus for controlling various systems such as an ignition system, a fuel system, intake and exhaust systems and a valve system relating to the engine 11, and controls the ignition timing and the amount of air and the injection amount of fuel to be supplied into each cylinder of the engine 11. As particular controlling targets of the engine ECU 2, the amount and the injection timing of fuel to be injected from the injector, the ignition timing of the ignition plug, the degree of opening of the throttle valve and so forth are listed.

The BMU 3 (Battery Management Unit) is an electronic controlling apparatus for managing the battery 15 of the vehicle 10. The BMU 3 controls operation of the inverter 14 to adjust electric power to be supplied by the battery 15 to the motor 12, and simultaneously calculates and detects a charging ratio SOC[%] (charging capacity [Ah]) of the battery 15.

The MCU 4 (Motor Control Unit) is an electronic controlling apparatus for controlling motor torque Tm and the motor rotation speed Nm of the motor 12 to be outputted from the motor 12 in response to a traveling state and driving operation of the vehicle 10.

The vehicle ECU 1 is a PHEV-ECU (Plug-in Hybrid Electric Vehicle—Electronic Control Unit) that is a higher-level electronic controlling apparatus than the other electronic controlling apparatus 2, 3 and 4, and has a function for totally managing the engine ECU 2, EMU 3 and MCU 4. For example, the vehicle ECU 1 monitors the timing of the control and the amount of the control performed by the other electronic controlling apparatus 2, 3 and 4 and intervenes in the control as occasion demands.

[2. Electronic Controlling Apparatus]
[2-1. Outline]

The vehicle ECU 1 automatically selects a traveling mode in response to a traveling state, a driving condition and so forth of the vehicle 10 and performs control of the operation state and the output power of the engine 11, the connection or disconnection state of the clutch, the output power of the motor 12, the amount of generation electric power of the generator 13 and so forth in response to the traveling mode. As the traveling mode of the vehicle 10, an EV traveling mode (first traveling mode), a series traveling mode (second traveling mode) and a parallel traveling mode (third traveling mode) are set here.

The EV traveling mode (first traveling mode) is a traveling mode in which the vehicle travels only with the motor 12 using electric power charged in the battery 15, and performs control similar to that in the driving method for the electric vehicle (EV). In the EV traveling mode, the clutch between the engine 11 and the driving wheels 17 is placed in an open state and the engine 11 is not driven, and supply of electric power from the battery 15 to the motor 12 is performed. Therefore, in the EV traveling mode, electric power supplied by the battery 15 is used and only the remaining amount (charging ratio SOC) of electric power of the battery 15 decreases. The EV traveling mode is selected when the charging ratio SOC of the battery 15 is sufficiently high and the vehicle travels at a speed (for example, 100 [km/h] or less) at which the motor traveling is possible.

The series traveling mode (second traveling mode) is a traveling mode in which the vehicle travels only with the motor 12 using electric power generated by the generator 13. In the series traveling mode, electric power generation is performed by the generator 13 using the output power of the engine 11, and electric power generated by the generator 13 is charged into the battery 15 through the inverter 14 or directly supplied to the motor 12 through the inverter 14. Electric power which is not supplied to the motor 12 out of electric power generated by the generator 13 is charged into the battery 15. It is to be noted that, in the series traveling mode, the clutch between the engine 11 and the driving wheels 17 is placed in an open state and the output power of the engine 11 is not transmitted to the driving wheels 17.

In short, in the series traveling mode, since the fuel is used for electric power generation, the remaining amount of fuel decreases and the remaining amount of electric power of the battery 15 increases or decreases. The series traveling mode is selected when high output power is required (the output power required for the vehicle 10 is high) in a case in which the charging ratio SOC of the battery 15 decreases, upon quick acceleration, upon traveling on an uphill slope or in a like case.

The parallel traveling mode (third traveling mode) is a traveling mode in which the vehicle travels mainly with the output power of the engine 11 using the fuel. In the parallel traveling mode, the clutch is engaged and the engine 11 drives the driving shaft and also performs electric power generation of the generator 13, and the generated electric power is charged into the battery 15. Further, when high output power is required (output power required for the vehicle 10 is high) such as, for example, when passing other vehicle at a high speed or when traveling an uphill slope, assist traveling in which engine traveling is assisted by the motor 12 is performed.

In short, in the parallel traveling mode, since the fuel is used for the traveling and electric power generation, the remaining amount of fuel reduces and the remaining amount of electric power of the battery 15 increases or decreases. It is to be noted that electric power used for driving the motor 12 in the parallel traveling mode is much lower than electric power used for driving the motor 12 in the EV traveling mode and the series traveling mode. The traveling mode is changed over automatically to the parallel traveling mode when the energy efficiency upon traveling using the engine 11 is higher than that upon traveling using the motor 12. The parallel traveling mode is particularly suitable for high-speed traveling.

Accordingly, for example, upon starting of the vehicle 10, the EV traveling mode is selected and the vehicle 10 advances and accelerates with the motor 12. If the charging ratio SOC of the battery 15 decreases during traveling in the EV traveling mode, the series traveling mode or the parallel traveling mode is selected in response to the vehicle speed V and the traveling mode is automatically changed over.

Further, when the vehicle speed V becomes high during traveling in the series traveling mode, the parallel traveling mode is selected, and then, if the charging ratio SOC of the battery 15 recovers (increases), the EV traveling mode is selected and the traveling mode is automatically changed over. It is to be noted that, in the series traveling mode, though the charging ratio SOC of the battery sometimes recovers (increases) by electric power generation of the generator 13, electric power generation is basically controlled so that the charging ratio SOC is maintained. This is carried out for the suppression of the consumption amount of fuel, and the charging ratio SOC is recovered to a full charge level upon next external charging.

Further, if the vehicle speed V decreases during traveling in the parallel traveling mode, the EV traveling mode or the series traveling mode is selected in response to the charging ratio SOC of the battery 15 and the traveling mode is automatically changed over.

A calculation process relating to a cruising distance (first cruising distance Dp1, second cruising distance Dp2 and total cruising distance DP) from among the calculation processes performed by the vehicle ECU 1 is described below. The vehicle ECU 1 includes a function for calculating the cruising distances Dp1, Dp2 and DP (distance to empty) which is estimated that the vehicle can travel with the remaining amount of electric power of the battery 15 and the remaining amount of fuel in the fuel tank based on the information transmitted thereto from the other electronic controlling apparatus 2, 3 and and another function for displaying the cruising distances Dp1, Dp2 and DP on the display apparatus 9. The vehicle ECU 1 in the present embodiment calculates the cruising distances Dp1, Dp2 and DP in response to the selected traveling mode from among the traveling modes described above. The cruising distances Dp1, Dp2 and DP calculated here are displayed on the display apparatus 9 continually.

[2-2. Other Electronic Controlling Apparatus]

First, calculation performed by the other electronic controlling apparatus 2, 3 and 4 in order for the calculation of the cruising distances Dp1, Dp2 and DP by the vehicle ECU 1 is described.

The engine ECU 2 controls the amount and the injection timing of fuel to be injected from the injector as described above. At this time, the engine ECU 2 performs integration of the fuel injected from the injector and grasps (stores) a total amount of the injected fuel (fuel injection amount) Fs (liter). If it is decided by a mode decision unit 1a hereinafter described that the traveling mode of the vehicle 10 is the series traveling mode or the parallel traveling mode, the engine ECU 2 performs the integration of the injected fuel and transmits a result of the integration (fuel injection amount Fs) to the vehicle ECU 1.

The BMU 3 has a functional element as an SOC calculation unit 3a. The SOC calculation unit 3a calculates and detects the charging ratio SOC of the battery 15 using a publicly known estimation method. For example, after the battery 15 is fully charged, integration of a discharge amount is performed based on a current value and a voltage value upon discharging of the battery and integration of a charge amount is performed based on a current value and a voltage value upon charging of the battery (regenerative charging). Then, present charge capacity is calculated in response to the charge/discharge amount and a charge capacity upon full charging and a value that represents the charging ratio SOC calculated as a ratio to the charge capacity upon full charging, for example, by the percentage is calculated.

In this case, while the charge capacity upon full charging is known in accordance with the standard of the battery 15, a publicly known technology for estimating a charge capacity upon full charging taking degradation of the battery 15 into consideration may be applied. For example, a charging ratio of the battery 15 upon starting of external charging (charging ratio upon charge start) is estimated from a relationship between an open circuit voltage and a charge state of the battery 15 grasped in advance, and an integration value of charging current from the charge start to the charge completion is calculated. Then, the charging ratio of the battery 15 upon charge completion (charging ratio upon charge completion) is estimated from the relationship described above, and a full charge capacity can be estimated by dividing the integration value by a difference value between the charging ratio upon charge completion and the charging ratio upon charge start.

Also there is a publicly known method by which an internal resistance value, an open circuit voltage, a battery temperature and so forth of the battery 15 are detected and the charging ratio SOC is calculated using an arithmetic operation based on a result of the detection. The estimation of the charging ratio SOC may be performed using the method. Information on the charging ratio SOC detected by calculating in the BMU 3 in this manner is transmitted to the vehicle ECU 1.

The MCU 4 has a functional element as a motor output calculation unit 4a. The motor output calculation unit 4a calculates a motor output power Pm [kW] in a predetermined period (for example, several tens [ms]) based on the rotation speed Nm [rpm] and the torque Tm [Nm] of the motor 12. The output power Pm of the motor 12 is controlled so as to increase or decrease in response to an output power (required output power) Pt [kW] required for the vehicle 10. If it is decided by the mode decision unit 1a that the traveling mode of the vehicle 10 is the EV traveling mode or the series traveling mode, the MCU 4 calculates the motor output power Pm in the predetermined period and transmits a result of the calculation (motor output power Pm) continually to the vehicle ECU 1.

[2-3. Controlling Block of the Vehicle ECU]

In order to implement calculation and display control of the cruising distances Dp1, Dp2 and DP, the vehicle ECU 1 includes functional elements as the mode decision unit 1a, a traveling distance calculation unit 1b, an electricity consumption calculation unit 1c, a fuel consumption calculation unit 1d, an electric mileage calculation unit 1e, a fuel mileage calculation unit 1f, a battery remaining amount calculation unit 1g, a fuel remaining amount calculation unit 1h, a storage unit 1k and a cruising distance calculation unit 1m.

The mode decision unit (traveling mode decision unit) 1a decides whether or not the vehicle 10 is traveling (in a traveling mode), and decides, if the vehicle 10 is traveling, in which one of the EV traveling mode, series traveling mode and parallel traveling mode the vehicle 10 is traveling. For example, the shift position SP detected by the shift position sensor 8 is used for the decision on whether or not the vehicle 10 is traveling. If the shift position SP indicates a D range or an R range (namely, a traveling range), the mode decision unit 1a decides that the vehicle 10 is traveling, whereas, if the shift position SP indicates a P range or an N range, the mode decision unit 1a decides that the vehicle 10 is stopping.

Further, as a main cause that the traveling mode of the vehicle 10 is changed over by the vehicle ECU 1, the charging ratio SOC of the battery 15, the vehicle speed V and the required output power Pt are listed. In particular, if the vehicle speed V is the speed at which the vehicle 10 can travel with the motor, the clutch disposed on the transmission path for transmitting the driving power of the engine 11 to the driving wheels 17 is opened and the EV traveling mode or the series traveling mode is selected. At this time, if the charging ratio SOC is high, the EV traveling mode is selected basically, and the series traveling mode is suitably selected when high output power is required. Further, if the charging ratio SOC is low, the series traveling mode is selected.

Further, when the vehicle speed V is a high speed at which the energy efficiency becomes higher if the motor driving is changed over to the engine driving, the clutch is engaged and the parallel traveling mode is selected.

Accordingly, for example, if all of conditions (1) to (4) given below are satisfied, then the mode decision unit 1a decides that the traveling mode is the EV traveling mode. Further, if the following conditions (1) and (2), and one of the conditions (3) and (4) are satisfied, then the mode decision unit 1a decides that the traveling mode is the series traveling mode. Further, if the following conditions (1) and (2) are not satisfied, then the mode decision unit 1a decides that the traveling mode is the parallel traveling mode irrespective of a result of the decision of the conditions (3) and (4). It is to be noted that, in a half clutch state in which the clutch is not engaged fully, the mode decision unit 1a decides that the traveling mode does not fall in any of the traveling modes.

(1) The vehicle speed V is lower than a predetermined vehicle speed V1.

(2) The clutch is in an open state.

(3) The charging ratio SOC of the battery 15 is equal to or higher than a predetermined charging ratio SOC1.

(4) The required output power Pt is lower than a predetermined output power P1.

The predetermined vehicle speed V1 here has a value lower than a maximum speed at which the vehicle can travel with the motor and is a speed proximate to the maximum speed (for example, 100 [km/h]). Further, the predetermined charging ratio SOC1 has a lower limit value (for example, 30 [%]) of an operation charging ratio range of the battery 15, and the predetermined output power P1 is an output value proximate to a value of a maximum output power which can be outputted by the motor 12. A result of the decision here is transmitted to other functional elements of the vehicle ECU 1 and to the other electronic controlling apparatus 2, 3 and 4.

The traveling distance calculation unit 1b calculates a distance actually traveled by the vehicle 10 in each of the traveling modes. When the traveling mode is the EV traveling mode, the driving wheels 17 of the vehicle 10 rotate at an angular rate corresponding to the rotation speed Nm of the motor 12. Therefore, the traveling distance calculation unit 1b calculates a distance (EV traveling distance) Dr1 traveled by the vehicle 10 in the EV traveling mode from the motor rotation speed Nm. The traveling distance calculation unit 1b integrates, for example, a value detected by a wheel speed sensor not depicted to calculate the EV traveling distance Dr1. Alternatively the EV traveling distance Dr1 may be calculated from the motor rotation speed Nm and a diameter of the driving wheels 17. The EV traveling distance Dr1 calculated in such a manner as just described is integrated and if the vehicle 10 travels a predetermined distance (for example, 1 [km]), a result of the integration is transmitted to the electric mileage calculation unit 1e.

When the traveling mode is the series traveling mode, similarly as in the case with the EV traveling mode, a distance (series traveling distance) Dr2 traveled by the vehicle 10 in the series traveling mode is calculated from the value of the wheel speed sensor or the motor rotation speed Nm. Also in this case, the traveling distance calculation unit 1b integrates the calculated series traveling distance Dr2 and if the vehicle 10 travels a predetermined distance (for example, 1 [km]), a result of the integration is transmitted to the electric mileage calculation unit 1e.

Further, when the traveling mode is the parallel traveling mode, since the vehicle 10 travels with the engine 11, the traveling distance calculation unit 1b calculates a distance (parallel traveling distance) Dr3 traveled by the vehicle 10 in the parallel traveling mode from the rotation speed Nt of the driving shaft. The traveling distance calculation unit 1b integrates a value detected by the wheel speed sensor to calculate the parallel traveling distance Dr3. Alternatively the parallel traveling distance Dr3 may be calculated from the rotation speed Nt of the driving shaft and the diameter of the driving wheels 17. The parallel traveling distance Dr3 calculated in such a manner as just described is integrated and if the vehicle 10 travels a predetermined distance (for example, 1 [km]), a result of the integration is transmitted to the fuel mileage calculation unit 1f. It is to be noted that, also in the case with the EV traveling mode and the series traveling mode, the traveling distances Dr1 and Dr2 may be calculated from the rotation speed Nt of the driving shaft.

The electricity consumption calculation unit (electricity consumption calculation means) 1c calculates an amount of electric power (power consumption amount) Ec [kWh] consumed during traveling of the vehicle 10 in the EV traveling mode and the series traveling mode in response to the traveling mode. The electricity consumption calculation unit 1c calculates electric power consumption amount Ec consumed while the vehicle 10 travels a unit distance D1 (for example, 1 [km]) set in advance in the EV traveling mode or the series traveling mode every time the vehicle 10 travels the unit distance D1. It is to be noted that, when the traveling mode of the vehicle 10 is the parallel traveling mode, since electric power consumption amount Ec is much small in comparison with those in the EV traveling mode and the series traveling mode, the electricity consumption calculation unit 1c omits the calculation of electric power consumption amount Ec.

When the traveling mode of the vehicle 10 is the EV traveling mode, the electricity consumption calculation unit 1c calculates electric power consumption amount Ec based on the charging ratio SOC of the battery 15. When the vehicle 10 is traveling in the EV traveling mode, electric power of the battery 15 is supplied to and consumed by the motor 12. Therefore, the electricity consumption calculation unit 1c calculates electric power consumption amount Ec based on a variation amount (power consumption) of the charging ratio SOC of the battery 15 every time the vehicle 10 travels the unit distance D1 in the EV traveling mode. A result of the calculation is transmitted to the electric mileage calculation unit 1e.

On the other hand, when the traveling mode of the vehicle 10 is the series traveling mode, the electricity consumption calculation unit 1c calculates electric power consumption amount Ec based on the output power Pm of the motor 12. When the vehicle 10 is traveling in the series traveling mode, since electric power is supplied from the battery 15 to the motor 12 and electric power generation by the generator 13 is also performed, the charging ratio SOC of the battery 15 increases or decreases. Therefore, in the case with the series traveling mode, in order to suppress increase of a calculation error or a calculation load, electric power consumption amount Ec is calculated based on the motor output power Pm in place of the charging ratio SOC of the battery 15.

For example, the electricity consumption calculation unit 1c integrates (time-integrates) the motor output power Pm during which the vehicle 10 travels the unit distance D1 in the series traveling mode, and applies the integrated motor output power Pm for the unit distance D1 to a map, a numerical formula or the like stored in advance that indicates a relationship between the output power Pm of the motor 12 and electric power consumption amount Ec to calculate electric power consumption amount Ec consumed while the vehicle 10 travels the unit distance D1. Alternatively the torque Tm of the motor 12 and the rotation speed Nm may be inputted to a map that indicates a relationship among the torque Tm, the rotation speed Nm and electric power consumption amount Ec to calculate electric power consumption amount Ec consumed while the vehicle 10 travels the unit distance D1. The electricity consumption calculation unit 1c calculates electric power consumption amount Ec every time the vehicle 10 travels the unit distance D1 in the series traveling mode and transmits a result of the calculation to the electric mileage calculation unit 1e.

The fuel consumption calculation unit 1d calculates an amount of fuel (fuel consumption amount) Fc [liter] consumed while the vehicle 10 is traveling in the series traveling mode and the parallel traveling mode based on the information from the engine ECU 2. When the vehicle 10 is traveling in the series traveling mode, since electric power generation is performed by the output power of the engine 11, the fuel is supplied to and consumed by the engine 11. Further, when the vehicle 10 is traveling in the parallel traveling mode, since the vehicle 10 travels with the engine 11, the fuel is supplied to and consumed by the engine 11.

Therefore, the fuel consumption calculation unit 1d calculates the fuel consumption amount Fc consumed while the vehicle 10 travels the unit distance D1 based on the fuel injection amount Fs transmitted from the engine ECU 2. For example, the fuel injection amount Fs is integrated (time-integrated) while the vehicle 10 travels the unit distance D1 in the series traveling mode or the parallel traveling mode. Consequently, the fuel consumption amount Fc is calculated every time the vehicle 10 travels the unit distance D1, and a result of the calculation is transmitted to the fuel mileage calculation unit 1f.

The electric mileage calculation unit (electric mileage calculation means) 1e calculates a traveling distance per a unit capacity of the battery 15 as an electric mileage Eef [km/kWh] when the traveling mode of the vehicle 10 is the EV traveling mode and the series traveling mode. Here, the electric mileage calculation unit 1e calculates the electric mileage Eef based on a first reference distance DT1 (for example, 25 [km]) which is comparatively short based on the EV traveling distance Dr1 and the series traveling distance Dr2 calculated by the traveling distance calculation unit 1b and electric power consumption amount Ec calculated by the electricity consumption calculation unit 1c. The first reference distance DT1 is a traveling distance of the vehicle 10, which defines a first data sampling interval for calculating the electric mileage Eef and is set in advance. Here, the first reference distance DT1 that defines the first sampling interval is set to 25 times as long as the unit distance D1.

Figures 3A, 3B:
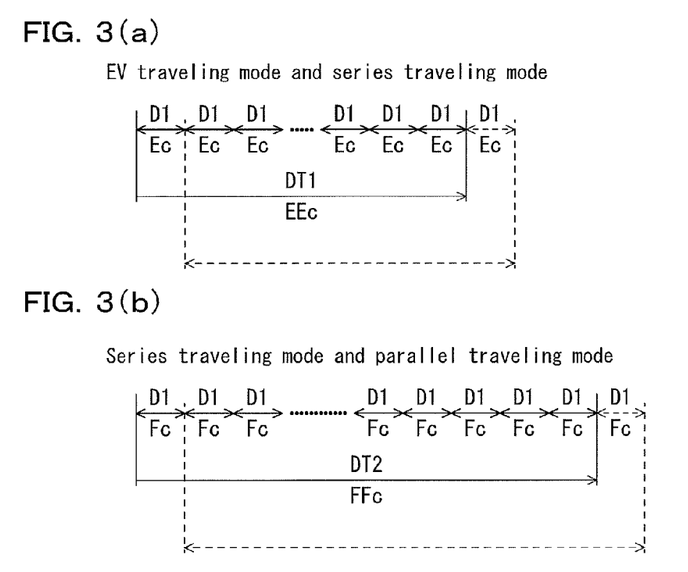

The calculation process is described with reference to FIG. 3(a). As indicated by a solid line in FIG. 3(a), when the vehicle 10 is traveling in the EV traveling mode or the series traveling mode, electric power consumption amount Ec is calculated and stored every time the vehicle 10 travels the unit distance D1. Then, if the traveling distance (sum of the EV traveling distance Dr1 and the series traveling distance Dr2) in the EV traveling mode and the series traveling mode reaches the first reference distance DT1, electric power consumption amount Ec calculated in the first reference distance DT1 is integrated (25 electric power consumption amounts Ec are integrated) and a total electric power consumption amount EEc [kWh] for the first reference distance DT1 is calculated. The electric mileage calculation unit 1e calculates the electric mileage Eef (=DT1/EEc [km/kWh]) in the first sampling interval from the total electric power consumption amount EEc for the first reference distance DT1 and a traveling distance (namely, first reference distance DT1) of the vehicle 10 in the first sampling interval.

It is to be noted that the electric mileage calculation unit 1e integrates 25 latest electric power consumption amounts Ec per unit distances D1 to calculate the total electric power consumption amount EEc. In particular, as indicated by a broken line in FIG. 3(a), when the vehicle 10 is traveling in the EV traveling mode or the series traveling mode, the latest electric power consumption amount Ec per the unit distance D1 is calculated continually and the total electric power consumption amount EEc is calculated from the 25 latest electric power consumption amounts Ec to update the electric mileage Eef. The information on the electric mileage calculated by the electric mileage calculation unit 1e is transmitted to the storage unit 1k and the cruising distance calculation unit 1m.

The fuel mileage calculation unit (fuel mileage calculation means) 1f calculates a traveling distance per a unit fuel amount as a fuel mileage Fef [km/liter] when the traveling mode of the vehicle 10 is the series traveling mode and the parallel traveling mode. Here, the fuel mileage calculation unit 1f calculates the fuel mileage Fef based on a second reference distance DT2 (for example, 50 [km]) that is comparatively long based on the series traveling distance Dr2 and parallel traveling distance Dr3 calculated by the traveling distance calculation unit 1b and the fuel consumption amount Fc calculated by the fuel consumption calculation unit 1d. The second reference distance DT2 is a traveling distance of the vehicle 10, which defines a second data sampling interval for calculating the fuel mileage Fef and is set in advance. Here, the second reference distance DT2 that defines a second sampling interval is set to 50 times as long as the unit distance D1.

The calculation process is described with reference to FIG. 3(b). As indicated by a solid line in FIG. 3(b), when the vehicle 10 is traveling in the series traveling mode or the parallel traveling mode, the fuel consumption amount Fc is calculated and stored every time the vehicle 10 travels the unit distance D1. Then, if the traveling distance (sum of the series traveling distance Dr2 and the parallel traveling distance Dr3) in the series traveling mode and the parallel traveling mode reaches the second reference distance DT2, the fuel consumption amount Fc calculated in the second reference distance DT2 is integrated (50 fuel consumption amounts Fc are integrated) and a total fuel consumption amount FFc [liter] for the second reference distance DT2 is calculated. The fuel mileage calculation unit 1f calculates the fuel mileage Fef (=DT2/FFc [km/liter]) in the second sampling interval from the total fuel consumption amount FFc for the second reference distance DT2 and the traveling distance (namely, second reference distance DT2) of the vehicle 10 in the second sampling interval.

It is to be noted that the fuel mileage calculation unit 1f integrates 50 latest fuel consumption amounts Fc per unit distances D1 to calculate the total fuel consumption amount FFc. Specifically, as indicated by a broken line in FIG. 3(b), when the vehicle 10 is traveling in the series traveling mode or the parallel traveling mode, the latest fuel consumption amount Fc per the unit distance D1 is calculated continually and the total fuel consumption amount FFc is calculated from the 50 latest fuel consumption amounts Fc to update the fuel mileage Fef. The information on the fuel mileage calculated by the fuel mileage calculation unit 1f is transmitted to the storage unit 1k and the cruising distance calculation unit 1m.

Figure 4:
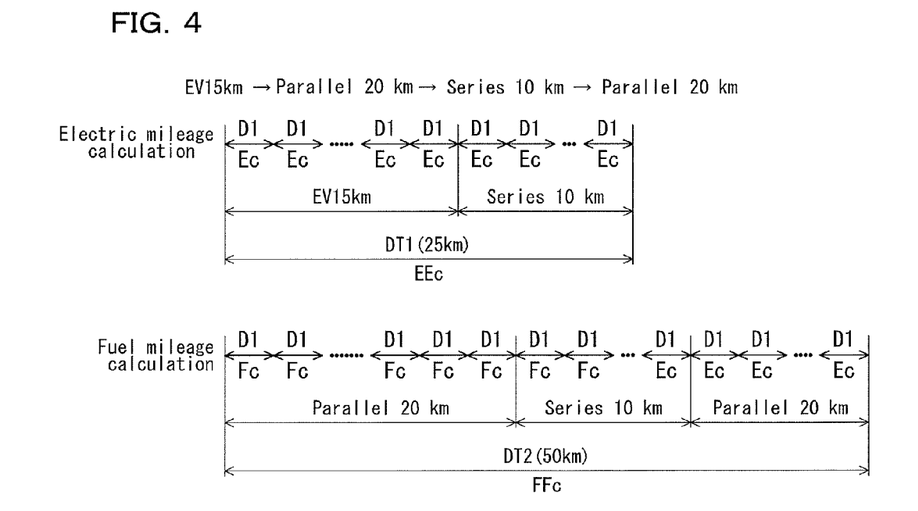
FIG. 4 is a view exemplifying particular electric mileage calculation and fuel mileage calculation by the cruising distance calculation apparatus of FIG. 1.

The above calculation processes are now described using a particular example. For example, when the vehicle 10 travels 15 [km] in the EV traveling mode, then is changed over to the parallel traveling mode and travels 20 [km] in the parallel traveling mode, then is changed over to the series traveling mode and travels 10 [km] in the series traveling mode, and then travels 20 [km] in the parallel traveling mode, the electric mileage Eef and the fuel mileage Fef are calculated as depicted in FIG. 4.

First, during traveling in the EV traveling mode, electric power consumption amount Ec is calculated by the electricity consumption calculation unit 1c every time the vehicle 10 travels the unit distance D1, and electric power consumption amount Ec for the EV traveling distance Dr1 (15 [km]) is transmitted to the electric mileage calculation unit 1e. Next, during traveling in the parallel traveling mode, the fuel consumption amount Fc is calculated by the fuel consumption calculation unit 1d every time the vehicle 10 travels the unit distance D1, and the fuel consumption amount Fc for the parallel traveling distance Dr2 (20 [km]) is transmitted to the fuel mileage calculation unit 1f.

Next, during traveling in the series traveling mode, electric power consumption amount Ec is calculated by the electricity consumption calculation unit 1c every time the vehicle 10 travels the unit distance D1, and the fuel consumption amount Fc is calculated by the fuel consumption calculation unit 1d every time the vehicle 10 travels the unit distance D1. In other words, in the series traveling mode, both of electric power consumption amount Ec and the fuel consumption amount Fc per the unit distance D1 are calculated. Then, electric power consumption amount Ec and the fuel consumption amount Fc for the series traveling distance Dr2 (10 [km]) are transmitted to the electric mileage calculation unit 1e and the fuel mileage calculation unit 1f, respectively.

If the sum of the EV traveling distance Dr1 and the series traveling distance Dr2 reaches the first reference distance DT1, the electric mileage calculation unit 1e adds electric power consumption amount Ec in the EV traveling mode and electric power consumption amount Ec in the series traveling mode to calculate the total electric power consumption amount EEc, and then calculates the electric mileage Eef from the total electric power consumption amount EEc and the first reference distance DT1.

Further, during traveling in the parallel traveling mode, the fuel consumption amount Fc for the parallel traveling distance Dr3 (20 [km]) is calculated by the fuel consumption calculation unit 1d and is transmitted to the fuel mileage calculation unit 1f. Then, if the sum of the parallel traveling distance Dr3 and the series traveling distance Dr2 reaches the second reference distance DT2, the fuel mileage calculation unit 1f adds the fuel consumption amount Fc in the parallel traveling mode and the fuel consumption amount Fc in the series traveling mode to calculate the total fuel consumption amount FFc, and calculates the fuel mileage Fef from the total fuel consumption amount FFc and the second reference distance DT2. It is to be noted that, when the traveling of the vehicle 10 continues thereafter, electric power consumption amount Ec and the fuel consumption amount Fc are updated to the latest ones in response to the traveling mode and calculation of the electric mileage Eef and the fuel mileage Fef is continuously performed.

The battery remaining amount calculation unit 1g detects or calculates a battery remaining amount (remaining amount of electric power) Er [kWh] of the battery 15. Here, the battery remaining amount Er is calculated, for example, from the charging ratio SOC and the total capacity (full charge capacity) of the battery 15 by multiplying them. Alternatively there is a publicly known method by which an internal resistance value, an open circuit voltage, a battery temperature and so forth of the battery 15 are detected and the battery remaining amount Er is calculated using an arithmetic operation based on the detected elements, and estimation of the battery remaining amount Er may be performed using the method. The battery remaining amount Er calculated in this manner is transmitted to the storage unit 1k and the cruising distance calculation unit 1m.

The fuel remaining amount calculation unit 1h detects or calculates a fuel remaining amount Fr [liter] in the fuel tank. For example, the fuel remaining amount calculation unit 1h may subtract an amount of consumed fuel (fuel consumption amount Fc) from a fuel amount just after refueling to calculate the fuel remaining amount Fr, or may use detection information from a fuel indicator (not depicted) for detecting the remaining amount Fr of the fuel reserved in the fuel tank as the fuel remaining amount Fr. The fuel remaining amount Fr calculated in this manner is transmitted to the storage unit 1k and the cruising distance calculation unit 1m.

The storage unit 1k stores the electric mileage Eef, the fuel mileage Fef, the battery remaining amount Er and the fuel remaining amount Fr transmitted thereto from the electric mileage calculation unit 1e, the fuel mileage calculation unit 1f, the battery remaining amount calculation unit 1g and the fuel remaining amount calculation unit 1h, respectively, and information transmitted from the cruising distance calculation unit 1m hereinafter described. Further, storage unit 1k updates the stored information when new information is transmitted. Further, in the storage unit 1k, initial values of the total electric power consumption amount EEc and the total fuel consumption amount FFc (initial total electric power consumption amount EEc0 and initial total fuel consumption amount FFc0) are stored. The information stored in the storage unit 1k is used in the calculation process by the cruising distance calculation unit 1m and the display on the display apparatus 9.

The cruising distance calculation unit (cruising distance calculation means) 1m calculates the first cruising distance Dp1 [km] which is an estimation value of a distance which the vehicle 10 can travel with the remaining amount (battery remaining amount Er) of electric power of the battery 15 and the second cruising distance Dp2 [km] which is an estimation value of a distance which the vehicle 10 can travel with the fuel remaining amount Fr, and calculates the overall total cruising distance DP [km] (=Dp1+Dp2) by adding the first and the second cruising distances Dp1 and Dp2.

The cruising distance calculation unit 1m multiplies the battery remaining amount Er transmitted thereto from the battery remaining amount calculation unit 1g by the electric mileage Eef transmitted thereto from the electric mileage calculation unit 1e to calculate the first cruising distance Dp1 (=Eef×Er). The calculation is performed when the traveling mode of the vehicle 10 is the EV traveling mode and the series traveling mode. Further, the cruising distance calculation unit 1m multiplies the fuel remaining amount Fr transmitted thereto from the fuel remaining amount calculation unit 1h by the fuel mileage Fef transmitted thereto from the fuel mileage calculation unit 1f to calculate the second cruising distance Dp2 (=Fef×Fr). The calculation is performed when the traveling mode of the vehicle 10 is the series traveling mode and the parallel traveling mode.

The cruising distance calculation unit 1m calculates the sum of the first cruising distance Dp1 and the second cruising distance Dp2 calculated in this manner as the total cruising distance DP, and transmits the first cruising distance Dp1, the second cruising distance Dp2 and the total cruising distance DP to the storage unit 1k and causes the display apparatus 9 to display the cruising distances. It is to be noted that, as depicted in FIG. 2, in addition to the total cruising distance DP, the first cruising distance Dp1 and the second cruising distance Dp2 are displayed on the display apparatus 9.

When the vehicle 10 is traveling in the EV traveling mode, the cruising distance calculation unit 1m causes the display apparatus 9 to display the first cruising distance Dp1 calculated at present and the second cruising distance Dp2 calculated in the last time and stored in the storage unit 1k, and adds the first and second cruising distances Dp1 and Dp2 to cause the display apparatus 9 to display the total cruising distance DP.

When the vehicle 10 is traveling in the series traveling mode, the cruising distance calculation unit 1m adds the first cruising distance Dp1 and the second cruising distance Dp2 calculated at present to calculate the total cruising distance DP, and causes the display apparatus 9 to display the first cruising distance Dp1, the second cruising distance Dp2 and the total cruising distance DP.

When the vehicle 10 is traveling in the parallel traveling mode, the cruising distance calculation unit 1m causes the display apparatus 9 to display the second cruising distance Dp2 calculated at present and the first cruising distance Dp1 calculated in the last time and stored in the storage unit 1k, and adds the first cruising distance Dp1 and the second cruising distance Dp2 to cause the display apparatus 9 to display the total cruising distance DP.

It is to be noted that, since the calculation result of the electric mileage Eef is not transmitted from the electric mileage calculation unit 1e in a period from the start of the traveling to the traveling of the first reference distance DT1, the cruising distance calculation unit 1m calculates the first cruising distance Dp1, for example, using the initial total electric power consumption amount EEc0 stored in the storage unit 1k. Alternatively upon ending of the traveling (upon switching off the power switch), the electric mileage Eef at the time is stored into the storage unit 1k, and the first cruising distance Dp1 may be calculated using the electric mileage Eef of the last traveling stored in the storage unit 1k in a period from the next start of the traveling starting to the traveling of the first reference distance DT1.

Similarly, since the calculation result of the fuel mileage Fef is not transmitted from the fuel mileage calculation unit 1f in a period from the start of the traveling to the traveling of the second reference distance DT2, the cruising distance calculation unit 1m calculates the second cruising distance Dp2, for example, using the initial total fuel consumption amount FFc0 stored in the storage unit 1k. Alternatively upon ending of the traveling (upon switching off the power switch), the fuel mileage Fef at the time is stored into the storage unit 1k, and the second cruising distance Dp2 may be calculated using the fuel mileage Fef of the last traveling stored in the storage unit 1k in a period from the next start of the traveling to the traveling of the second reference distance DT2.

[3. Flow Chart]

Now, the controlling procedure by the present cruising distance calculation apparatus is described with reference to FIG. 5. The processing of the flow chart is performed when the power switch is placed into an on state.

Figure 5:
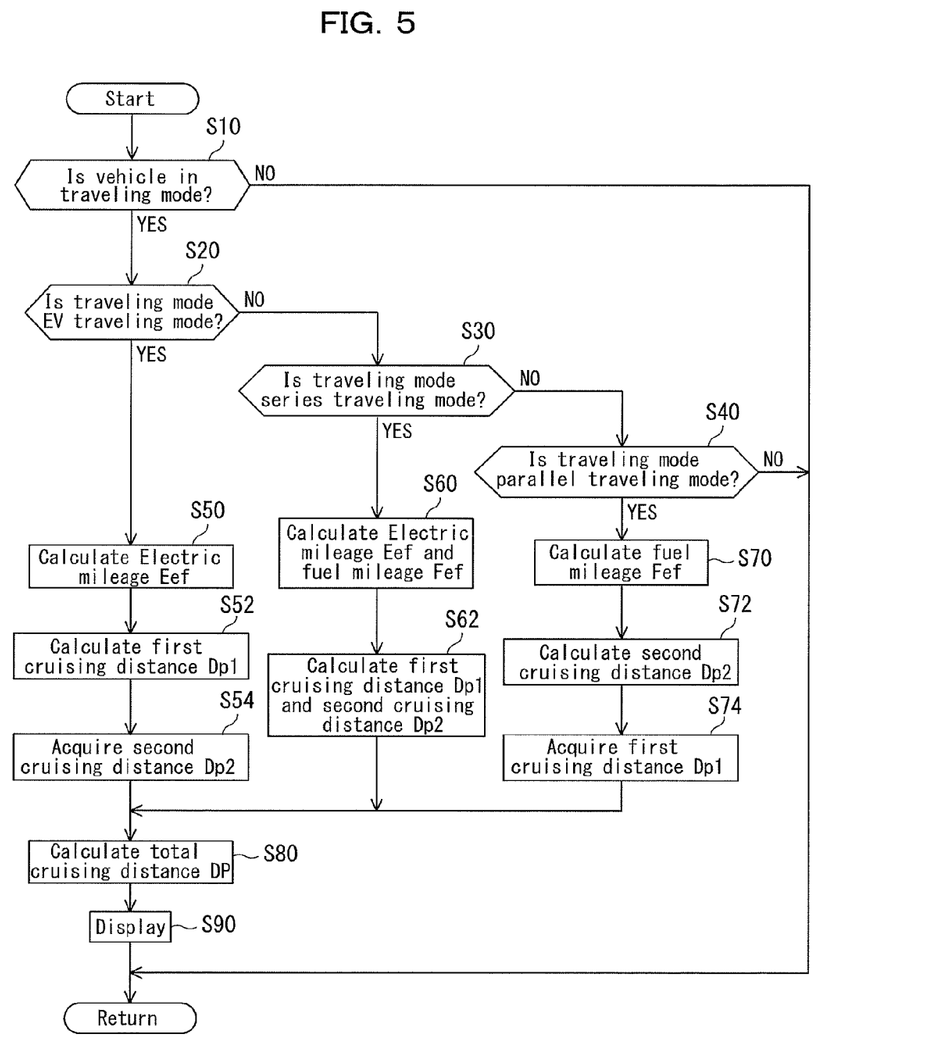
FIG. 5 is a flow chart exemplifying a calculation process by the cruising distance calculation apparatus of FIG. 1.

As depicted in FIG. 5, it is decided at step S10 whether or not the vehicle 10 is traveling. Here, for example, if the shift position SP detected by the shift position sensor 8 is the D range or the R range, then it is decided that the vehicle 10 is traveling (in a traveling mode) and the processing advances to step S20. On the other hand, if the shift position SP is the N range or the P range, then it is decided that the vehicle 10 is not traveling and the processing advances to step S110.

At step S20, it is decided by the mode decision unit 1a whether or not the traveling mode is the EV traveling mode. In other words, it is decided whether or not all of the conditions (1) to (4) described above are satisfied. If all of the conditions (1) to (4) are satisfied, then it is decided that the traveling mode is the EV traveling mode and the processing advances to step S50. On the other hand, if at least one of the conditions (1) to (4) is not satisfied, then it is decided that the traveling mode is not the EV traveling mode and the processing advances to step S30.

At step S30, it is decided by the mode decision unit 1a whether or not the traveling mode is the series traveling mode. In other words, it is decided whether or not the conditions (1) and (2) described above and one of the conditions (3) and (4) are satisfied, and if the conditions just described are satisfied, then it is decided that the traveling mode is the series traveling mode and the processing advances to step S60. On the other hand, if the conditions just described are not satisfied, then it is decided that the traveling mode is not the series traveling mode and the processing advances to step S40.

At step S40, it is decided by the mode decision unit 1a whether or not the traveling mode is the parallel traveling mode. In other words, it is decided whether or not the conditions (1) and (2) described above are satisfied, and if the conditions just described are satisfied, then it is decided that the traveling mode is the parallel traveling mode and the processing advances to step S70. On the other hand, if the conditions just described are not satisfied, then the flow is returned. As the case in which the conditions just described are not satisfied, for example, a case of a half clutch state is listed.

At step S50, electric power consumption amount Ec in the EV traveling mode is calculated and the calculation of the electric mileage Eef is performed by the electric mileage calculation unit 1e. Then at step S52, the first cruising distance Dp1 is calculated by the cruising distance calculation unit 1m, and at step S54, the second cruising distance Dp2 is acquired from the storage unit 1k. Then at step S80, the first cruising distance Dp1 and the second cruising distance Dp2 are added to calculate the total cruising distance DP. At step S90, the first cruising distance Dp1 calculated at step S52, the second cruising distance Dp2 acquired at step S54 and the total cruising distance DP calculated at step S80 are displayed and then the flow is returned.

At step S60, electric power consumption amount Ec and the fuel consumption amount Fc in the series traveling mode are calculated, the calculation of the electric mileage Eef is performed by the electric mileage calculation unit 1e, and the calculation of the fuel mileage Fef is performed by the fuel mileage calculation unit 1f. Then at step S62, the first cruising distance Dp1 and the second cruising distance Dp2 are calculated by the cruising distance calculation unit 1m. Then at step S80, the first cruising distance Dp1 and the second cruising distance Dp2 are added to calculate the total cruising distance DP. At step S90, the first cruising distance Dp1 and the second cruising distance Dp2 calculated at step S62 and the total cruising distance DP calculated at step S80 are displayed, and then the flow is returned.

At step S70, the fuel consumption amount Fc in the parallel traveling mode is calculated and the calculation of the fuel mileage Fef is performed by the fuel mileage calculation unit 1f. Then at step S72, the second cruising distance Dp2 is calculated by the cruising distance calculation unit 1m, and at step S74, the first cruising distance Dp1 is acquired from the storage unit 1k. Then at step S80, the first cruising distance Dp1 and the second cruising distance Dp2 are added to calculate the total cruising distance DP. At step S90, the second cruising distance Dp2 calculated at step S72, the first cruising distance Dp1 acquired at step S74 and the total cruising distance DP calculated at step S80 are displayed, and then the flow is returned.

[4. Effects]

(1) Accordingly, with the present cruising distance calculation apparatus, electric power consumption amount Ec is calculated based on one of electric power consumption of the battery 15 and the output power Pm of the motor 12 depending upon the traveling mode selected from the EV traveling mode and the series traveling mode. Therefore, the electric mileage Eef can be calculated taking the traveling mode into consideration and the calculation accuracy of the electric mileage Eef can be enhanced. Consequently, the reliability and the validity of the calculation value of the first cruising distance Dp1 in the cruising distance calculation unit 1m can be enhanced.

In other words, in the EV traveling mode, since electric power consumption amount Ec is calculated based on electric power consumption of the battery 15, an accurate electric power consumption amount Ec can be calculated in a simple manner and the calculation accuracy of the electric mileage Eef can be enhanced. Further, in the series traveling mode, since electric power consumption amount Ec is calculated based on the output power Pm of the motor 12, the balance (between charging and discharging) of the battery 15 does not need to be calculated at all times and electric power consumption amount Ec can be calculated without increasing the calculation load.

(2) Further, since the fuel consumption amount Fc is calculated when the selected traveling mode is the series traveling mode and the parallel traveling mode and the calculation of the fuel mileage Fef is performed based on the fuel consumption amount Fc, the fuel mileage Fef can be calculated taking the traveling mode into consideration. Therefore, the calculation accuracy of the fuel mileage Fef can be enhanced and the reliability and the validity of the calculation value of the second cruising distance Dp2 can be enhanced.

(3) Further, since the display apparatus 9 for displaying the total cruising distance DP that is the overall cruising distance calculated by adding the first cruising distance Dp1 and the second cruising distance Dp2 calculated by the cruising distance calculation unit 1m is provided, the occupant can easily grasp the remaining traveling allowable distance.

(4) Further, since the first cruising distance Dp1 and the second cruising distance Dp2 calculated by the cruising distance calculation unit 1m are also displayed on the display apparatus 9, the occupant can decide whether charging of the battery 15 should be performed or refueling should be performed.

(5) It is to be noted that, when the parallel traveling mode is selected, since electric power consumption amount Ec is much small in comparison with those in the EV traveling mode and the series traveling mode, the controlling configuration can be simplified without degrading the calculation accuracy by intentionally omitting the calculation of electric power consumption amount Ec in the parallel traveling mode. Consequently, since the calculation formula, the map or the like for the calculation of electric power consumption amount Ec in the parallel traveling mode does not need to be stored in the vehicle ECU 1, the storage capacity can be reduced.

[5. Others]

While the embodiment of the present invention is described above, the present invention is not limited to the embodiment specifically described above and can be carried out suitably modifying or suitably applying the embodiment without departing from the scope of the present invention.

For example, in the embodiment described above, a hybrid vehicle having three traveling modes including the EV traveling mode, the series traveling mode and the parallel traveling mode is exemplified. However, the present cruising distance calculation apparatus can be applied to a hybrid vehicle that at least has the EV traveling mode and the series traveling mode. Further, in case where the traveling modes do not include the parallel traveling mode, the calculation of the fuel mileage Fef, the fuel remaining amount Fr and so forth for use in the calculation of the second cruising distance Dp2 is also unnecessary. Further, the vehicle 10 is not limited to a plug-in hybrid electric vehicle (PHEV) but may also be a hybrid electric vehicle (HEV).

Further, the calculation method of the electric mileage Eef or the fuel mileage Fef described in the foregoing description of the embodiment is an example, and is not limited to such a calculation method as described above. Further, the unit distance D1, the first reference distance DT1 and the second reference distance DT2 are not limited to those distances described hereinabove, and for example, the first reference distance DT1 and the second reference distance DT2 may be equal to each other.

Further, the calculation method of the fuel consumption amount Fc while the vehicle 10 travels the unit distance D1 is not limited to that described hereinabove, and for example, a fuel gauge for detecting the fuel amount in the fuel tank may be provided such that a sensor value detected by the fuel gauge is used.

Further, when the vehicle 10 is traveling in the parallel traveling mode, the calculation of the electric mileage Eef may be performed in addition to the calculation of the fuel mileage Fef. In this instance, the cruising distance calculation apparatus may be configured otherwise such that, for example, the motor output power Pm upon motor assisting is integrated to calculate electric power consumption amount Ec.

Further, the display apparatus 9 is not limited to that described hereinabove but may also be a display apparatus that displays only the total cruising distance DP. Alternatively an apparatus that notifies the occupant of a cruising distance by such units as voice may be used in place of the display apparatus.

REFERENCE SIGNS LIST 1 vehicle ECU (PHEV-ECU)
1a mode decision unit (traveling mode decision unit)
1b traveling distance calculation unit
1c electricity consumption calculation unit
1d fuel consumption calculation unit
1e electric mileage calculation unit
1f fuel mileage calculation unit
1g battery remaining amount calculation unit
1h fuel remaining amount calculation unit
1k storage unit
1m cruising distance calculation unit
2 engine ECU
3 BMU (battery management unit)
3a SOC calculation unit
4 MCU (motor control unit)
4a motor output calculation unit
5 motor rotation speed sensor
6 accelerator position sensor
7 rotation speed sensor
8 shift position sensor
9 display apparatus (display unit)
10 hybrid vehicle (vehicle)
11 engine
12, 12F, 12R motor
13 generator
15 battery
DP total cruising allowable distance
Dp1 first cruising distance
Dp2 second cruising distance
Ec electric power consumption amount
Fc fuel consumption amount
Eef electric mileage
Fef fuel mileage
Er battery remaining amount
Fr fuel remaining amount The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A cruising distance calculation apparatus for a hybrid vehicle, comprising a motor to drive the hybrid vehicle and an engine to drive a generator, the hybrid vehicle travelling in a traveling mode selected from a plurality of traveling modes including a first traveling mode in which the vehicle travels with electric power supplied from a battery while the engine is not driven and a second traveling mode in which the vehicle travels with electric power generated by the generator being driven by the engine while transmission of driving force from the engine to wheels is interrupted, an electricity consumption calculation unit that calculates an electric power consumption amount of the battery consumed by the traveling of the vehicle;

an electric mileage calculation unit that calculates a traveling distance per a unit capacity of the battery as an electric mileage based on electric power consumption amount calculated by the electricity consumption calculation unit and a traveling distance of the vehicle; and a cruising distance calculation unit that estimates a distance which the vehicle can travel with a remaining amount of electric power of the battery as a first cruising distance based on the electric mileage calculated by the electric mileage calculation unit and the remaining amount of electric power, wherein the electricity consumption calculation unit calculates, when the first traveling mode is selected, the electric power consumption amount of the battery based on power consumption of the battery whereas the electricity consumption calculation unit calculates, when the second traveling mode is selected, the electric power consumption amount based on output power of the motor.

2. The cruising distance calculation apparatus for a hybrid vehicle according to claim 1, wherein the traveling modes further include a third traveling mode in which the vehicle travels with the driving force transmitted from the engine to the wheels;

the cruising distance calculation apparatus further comprises a fuel mileage calculation unit that calculates, when the second traveling mode or the third traveling mode is selected, a traveling distance per a unit fuel amount as a fuel mileage based on the consumption amount of fuel consumed by the engine and the traveling distance of the vehicle traveled in the selected traveling mode; and the cruising distance calculation unit estimates a distance which the vehicle can travel with a remaining amount of fuel as a second cruising distance based on the fuel mileage calculated by the fuel mileage calculation unit and the remaining amount of fuel.

3. The cruising distance calculation apparatus for a hybrid vehicle according to claim 2, wherein the cruising distance calculation unit calculates a total cruising distance that is an overall cruising distance calculated by adding the first cruising distance and the second cruising distance, the vehicle further comprises a display unit that displays the total cruising distance calculated by the cruising distance calculation unit.

4. The cruising distance calculation apparatus for a hybrid vehicle according to claim 3, wherein the display unit displays the first cruising distance and the second cruising distance that are calculated by the cruising distance calculation unit.

* * * * *